United States Patent Office
3,495,976
Patented Feb. 17, 1970

3,495,976
METHOD OF SEPARATING A LAYER OF GOLD FROM A BASE OF NON-FERROUS OR RARE METALS OR THEIR ALLOYS
Viktor Mamertovich Bazilevsky and Andronik Pogosovich Amarian, Moscow, U.S.S.R., assignors to Moskovsky zavod vtorichnykh dragotsennykh metallov, Moscow, U.S.S.R.
No Drawing. Filed Dec. 22, 1964, Ser. No. 420,460
Int. Cl. C22b 11/04
U.S. Cl. 75—101                                    2 Claims

ABSTRACT OF THE DISCLOSURE

A method of separating a gold coating from a substrate comprising tungsten or molybdenum comprising treating the coating with an aqueous solution consisting essentially of water, potassium iodide and dissolved free iodine whereby the gold coating is dissolved without chemically affecting the tungsten or molybdenum, separating the solution from the metal and removing the dissolved gold from the solution.

---

The present invention relates to a method for separating from a metal a layer of gold, applied to a base of non-ferrous and rare metals or their alloys, for example, of tungsten, molybdenum, and the like.

A method is known for separating a layer of gold from a base metal by dissolving the gold in cyanide solutions. A disadvantage of said method is the toxicity of said cyanide solutions. Moreover, said method is not suitable for treating materials, the base of which is soluble in cyanide solutions, for example, tungsten and molybdenum.

An object of the present invention is to eliminate said disadvantages.

A principal object of the invention is the provision of such a method for separating a layer of gold from a base of non-ferrous and rare metals or their alloys, without destroying said base, the toxicity being substantially decreased.

According to the present invention, a solvent comprising a solution of halogen compounds is employed, for example, a solution of iodine in an aqueous solution of potassium iodide, that is capable of rapidly dissolving a layer of gold and does not react with the material of the base to an appreciable extent.

After separating the solution, in which the gold has been dissolved, from the gold-free base, which was not attacked by the solution, the metal of the base may be reused, whereas the gold may be separated from the solution by any known method, for example, by carburizing, electrolysis, distillations, etc.

When separating gold by distilling off the iodine vapours, said vapours may be absorbed by a solution of potassium iodide. The resulting saturated with iodine is recycled for treating new batches of material wastes. Thus, the dissolving agent is completely recovered, and its consumption is determined only by the process losses.

The method according to this invention allows with minimum expense the complete separation of gold from other metals, the metal of the base being preserved, which, in case of treating, for example, tungsten and molybdenum wires, results in a large economical saving.

Example

An initial sample of gold-plated metal, which is a waste product of radio-engineering and electrovacuum industries, namely, a gold-plated carcass of a copper wire, wound with a thin gilded tungsten filament, was treated for 10 min. at a temperature of 25° C. at a weight ratio S:L (solid:liquid)=1:10 with an aqueous solution, containing 200 g. of potassium iodide per liter, in which preliminarily 200 g. of iodine per liter were also dissolved.

Then the metal wastes were recovered and rinsed with water. No trace of gold was revealed on the surface of said metal wastes.

The solution was reused for treating new batches of wastes.

During this process, the tungsten did not dissolve to any appreciable extent.

To extract gold from this solution, sulfuric acid of density 1.84 was added thereto in an amount of 50 ml. per 100 ml. of the spent solution. In a closed vessel the mixture was heated to a temperature near the boiling point of the solution and maintained at that temperature for 45 to 50 min.

The evolving iodine vapours were drawn off through pipes and were completely absorbed in a 20 percent aqueous solution of potassium iodide, which, after being saturated with iodine, was reused to treat other batches of gilded wastes. After distilling off iodine, gold was separated from the solution as a high-purity metal powder, being then collected on a filter from the solution and rinsed with water.

The washed powder may be melten so as to obtain an ingot.

The obtained gold-free solution, after the excess of acid has been neutralized, may be used for the manufacture of potassium sulfate by a simple crystallization performed by known methods.

We claim:

1. A method of separating a layer of gold adhered to a substrate consisting essentially of a metal selected from the group consisting of tungsten, molybdenum, copper, and mixtures and alloys thereof comprising treating said layer with an aqueous solution consisting essentially of water, potassium iodide and dissolved free iodine whereby said layer of gold is dissolved without chemically affecting said substrate, separating said solution from said substrate and removing said dissolved gold from said solution, said treatment being carried out at approximately room temperature with said aqueous solution containing about 200 g. of potassium iodide and about 200 g. of iodine per liter.

2. The method of claim 1 wherein said solution is recycled for retreatment of additional gold layers after said gold has been separated therefrom.

References Cited

UNITED STATES PATENTS

| 861,535 | 7/1907 | Pritchard | 75—118 |
| 1,857,664 | 5/1932 | Schlotter. | |
| 2,304,823 | 12/1942 | Harrison | 75—18 |
| 2,978,366 | 4/1961 | Harwig et al. | 134—3 |

JOSEPH SCOVRONEK, Primary Examiner

U.S. Cl. X.R.

23—121; 75—118; 134—2, 3, 42; 252—364